(12) United States Patent
Im et al.

(10) Patent No.: US 10,915,574 B2
(45) Date of Patent: Feb. 9, 2021

(54) APPARATUS AND METHOD FOR RECOGNIZING PERSON

(71) Applicant: ELECTRONICS AND TELECOMMUNICATIONS RESEARCH INSTITUTE, Daejeon (KR)

(72) Inventors: Dong Hyuck Im, Daejeon (KR); Yong Seok Seo, Daejeon (KR); Jung Hyun Kim, Daejeon (KR); Jee Hyun Park, Daejeon (KR); Won Young Yoo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 319 days.

(21) Appl. No.: 15/880,763

(22) Filed: Jan. 26, 2018

(65) Prior Publication Data

US 2019/0179960 A1 Jun. 13, 2019

(30) Foreign Application Priority Data

Dec. 12, 2017 (KR) ........................ 10-2017-0170282

(51) Int. Cl.
*G06K 9/00* (2006.01)
*G06F 16/783* (2019.01)
(Continued)

(52) U.S. Cl.
CPC ........ *G06F 16/784* (2019.01); *G06F 16/7834* (2019.01); *G06K 9/00221* (2013.01); *G10L 17/00* (2013.01); *G10L 17/10* (2013.01)

(58) Field of Classification Search
CPC .............. G06F 16/7834; G06F 16/784; G06K 9/00221; G06K 9/00288; G06K 9/00711; G10L 17/005; G10L 17/10
See application file for complete search history.

(56) References Cited

U.S. PATENT DOCUMENTS

| 8,879,799 B2 | 11/2014 | Song et al. |
| 9,743,033 B2 | 8/2017 | Kim et al. |

(Continued)

FOREIGN PATENT DOCUMENTS

| KR | 10-0792016 B1 | 1/2008 |
| KR | 10-2008-0074266 A | 8/2008 |
| KR | 10-1720514 B1 | 4/2017 |

*Primary Examiner* — Mekonen T Bekele
(74) *Attorney, Agent, or Firm* — LRK Patent Law Firm

(57) ABSTRACT

An apparatus for recognizing a person includes a content separator configured to receive contents and separate the contents into video content and audio content; a video processor configured to recognize a face from an image in the video content received from the content separator and obtain information on a face recognition section by analyzing the video content; an audio processor configured to recognize a speaker from voice data in the audio content received from the content separator and obtain information on a speaker recognition section by analyzing the audio content; and a person recognized section information provider configured to provide information on a section of the contents in which a person appears based on the information on the face recognition section and the information on the speaker recognition section.

15 Claims, 5 Drawing Sheets

(51) Int. Cl.
   *G10L 17/10*          (2013.01)
   *G10L 17/00*          (2013.01)

(56)          References Cited

U.S. PATENT DOCUMENTS

| | | | |
|---|---|---|---|
| 9,892,344 B1* | 2/2018 | Tran | G06K 9/66 |
| 10,178,301 B1* | 1/2019 | Welbourne | G06K 9/00892 |
| 2005/0004710 A1* | 1/2005 | Shimomura | G06K 9/00281 |
| | | | 700/246 |
| 2009/0316962 A1* | 12/2009 | Sun | G06K 9/00248 |
| | | | 382/118 |
| 2012/0162470 A1* | 6/2012 | Kim | G06F 16/58 |
| | | | 348/231.2 |
| 2013/0188031 A1 | 7/2013 | Park et al. | |
| 2014/0086450 A1* | 3/2014 | Huang | G06K 9/00295 |
| | | | 382/103 |
| 2014/0088961 A1* | 3/2014 | Woodward | G10L 15/22 |
| | | | 704/235 |
| 2015/0199561 A1 | 7/2015 | Jeong et al. | |
| 2016/0360150 A1* | 12/2016 | Onno | H04N 7/142 |
| 2017/0116466 A1* | 4/2017 | Resnick | A61K 47/26 |
| 2017/0185827 A1* | 6/2017 | Yamaya | G10L 25/78 |
| 2017/0351485 A1* | 12/2017 | Kohler | G06F 3/165 |
| 2018/0232591 A1* | 8/2018 | Hicks | G06K 9/00892 |
| 2019/0147228 A1* | 5/2019 | Chaudhuri | G06K 9/00288 |
| | | | 382/118 |
| 2019/0176845 A1* | 6/2019 | Yoon | G10L 17/00 |
| 2019/0342243 A1* | 11/2019 | Lee | H04L 51/20 |

* cited by examiner

APPARATUS AND METHOD FOR RECOGNIZING PERSON

CROSS-REFERENCE TO RELATED APPLICATION

This application claims priority to Korean Patent Application No. 10-2017-0170282, filed Dec. 12, 2017 in the Korean Intellectual Property Office (KIPO), the entire content of which is hereby incorporated by reference.

BACKGROUND

1. Field of the Invention

Example embodiments of the present invention relate to an apparatus and method for recognizing a person or a character and more specifically to an apparatus and method for recognizing a person or a character in contents by using face recognition and speaker recognition.

2. Description of Related Art

With an increase in communication, broadcasting, and media and the development of digital video equipment, the amount of video content that may be obtained by users is rapidly increasing. People want to quickly obtain information on fields in which they are interested among numerous pieces of video content. However, since a great number of movies and dramas are being provided, it is difficult to search a massive amount of contents for a desired video clip or scene. A kind of information that is the most meaningful and popular among people in video content relates to persons. While viewing televisions (TVs) or playing video clips, many people want to search for scenes in which desired actors, actresses, or persons, appear.

In connection with this, studies have, been conducted to analyze a scene of a video clip in which an actor or actress appears by using face recognition, but there are limitations in the corresponding method. In other words, existing face recognition technology works only when limiting environmental conditions such as uniform background and lighting, a frontal face positioned at the center of an image, etc., are satisfied. Although performance in a non-limiting environment has been improved through various attempts, a frontal face is still required to maintain recognition performance. Therefore, when face recognition is performed in video clips such as dramas and movies, no actor or actress is recognized still in many video clip sections.

SUMMARY

Accordingly, example embodiments of the present invention are provided to substantially obviate one or more problems due to limitations and disadvantages of the related art.

Accordingly, embodiments of the present disclosure provide an apparatus for recognizing a person in contents using face recognition and speaker recognition.

Accordingly, embodiments of the present disclosure also provide a method for recognizing a person in contents using face recognition and speaker recognition.

In order to achieve the objective of the present disclosure, an apparatus for recognizing a person may comprise a content separator configured to receive contents and separate the contents into video content and audio content; a video processor configured to recognize a face from an image in the video content received from the content separator and obtain information on a face recognition section by analyzing the video content; an audio processor configured to recognize a speaker from voice data in the audio content received from the content separator and obtain information on a speaker recognition section by analyzing the audio content; and a person recognized section information provider configured to provide information on a section of the contents in which a person appears based on the information on the face recognition section and, the information on the speaker recognition section.

The person recognized section information provider selects the face recognition section and the speaker recognition section of the person by comparing the information on the face recognition section and the information on the speaker recognition section, and determines whether the face recognition section and the speaker recognition section of the person overlap.

When the face recognition section and the speaker recognition section of the person overlap, the person recognized section information provider determines a union of the face recognition section and the speaker recognition section as a person recognition section.

When the face recognition section and the speaker recognition section, of the person are adjacent but separated by a gap of a threshold value or less, the person recognized section information provider determines a sum of the face recognition section, the speaker recognition section, and the gap as a person recognition section.

The video processor periodically extracts a frame image from the video content input from the content separator, performs face detection and face alignment in units of extracted frames, performs face recognition on an aligned face image, and performs face tracking.

The video processor performs the face recognition by using a Softmax function in a deep learning model output process.

The video processor performs the face detection by using Haar-like features or deep learning-based object detection technology.

The video processor performs the face tracking while calculating a similarity between a face image of a previous frame and a face image of a current frame, and finishes the face tracking when the similarity between the face image of the previous frame and the face image of the current frame is a threshold value or less.

The audio processor extracts a voice signal from the audio content by using an independent component analysis (ICA) technique, segments the voice signal based on silence, and performs speaker recognition on segmented unit voices.

The audio processor uses face recognition data obtained from the video processor as learning data for speaker recognition.

The audio processor performs face recognition by using a Softmax function in a deep learning model output process.

In order to achieve the objective of the present disclosure, a method of recognizing a person may comprise receiving contents and separating the contents into video content and audio content; a video processing of recognizing a face from an image in the video content and obtaining information on a face recognition section by analyzing the video content; an audio processing of recognizing a speaker from voice data in the audio content and obtain information on a speaker recognition section by analyzing the audio content; and providing information on a section of the contents in which a person appears based on the information on the face recognition section and the information on the speaker recognition section.

The providing information on the section of the contents in which the person appears comprises: selecting the face recognition section and the speaker recognition section of the person by comparing the information on the face recognition section and the information on the speaker recognition section; determining whether the face recognition section and the speaker recognition section of the person overlap; and determining a union of the face recognition section and the speaker recognition section as a person recognition section when the face recognition section and the speaker recognition section of the person overlap.

The providing the information on the section of the contents in which the person appears further comprises, when the face recognition section and the speaker recognition section of the person are adjacent but separated by a gap of a threshold value or less, determining a sum of the face recognition section, the speaker recognition section, and the gap as a person recognition section.

The video processing operation comprises: periodically extracting a frame image from the video content; performing face detection and face alignment in units of extracted frames; performing face recognition on an aligned face image; and generating the face recognition section by tracking a recognized face.

The performing face detection and face alignment in units of extracted frames comprises: performing the face detection by using Haar-like features or deep learning-based object detection technology; and aligning the face based on feature points of a detected face image.

The generating the face recognition section by tracking the recognized face comprises performing the face tracking while calculating a similarity between a face image of a previous frame and a face image of a current frame, and finishing the face tracking when the similarity between the face image of the previous frame and the face image of the current frame is a threshold value or less.

In order to achieve the objective of the present disclosure, an apparatus for recognizing a person may comprise a processor; and a memory configured to store at least one instruction executed by the processor, wherein the at least one instruction includes: an instruction to receive and separate contents into video content and audio content; an instruction to recognize a face from an image in the video content and obtain information on a face recognition section by analyzing the video content; an instruction to recognize a speaker from voice data in the audio content and obtain information on a speaker recognition section by analyzing the audio content; and an instruction to provide information on a section of the contents in which a person appears based on the information on the face recognition section and the information on the speaker recognition section.

The apparatus for recognizing a person may further comprise a communication module configured to operate in conjunction with at least one search engine via a network, receive contents from at least one content providing apparatus, and transfer the contents to the processor.

The apparatus for recognizing a person may further comprise a person information database configured to store information on at least one person and information on a section of the contents in which the at least one person appears.

BRIEF DESCRIPTION OF DRAWINGS

Example embodiments of the present invention will become more apparent by describing in detail example embodiments of the present invention with reference to the accompanying drawings, in which.

DETAILED DESCRIPTION OF THE INVENTION

Figure 1:
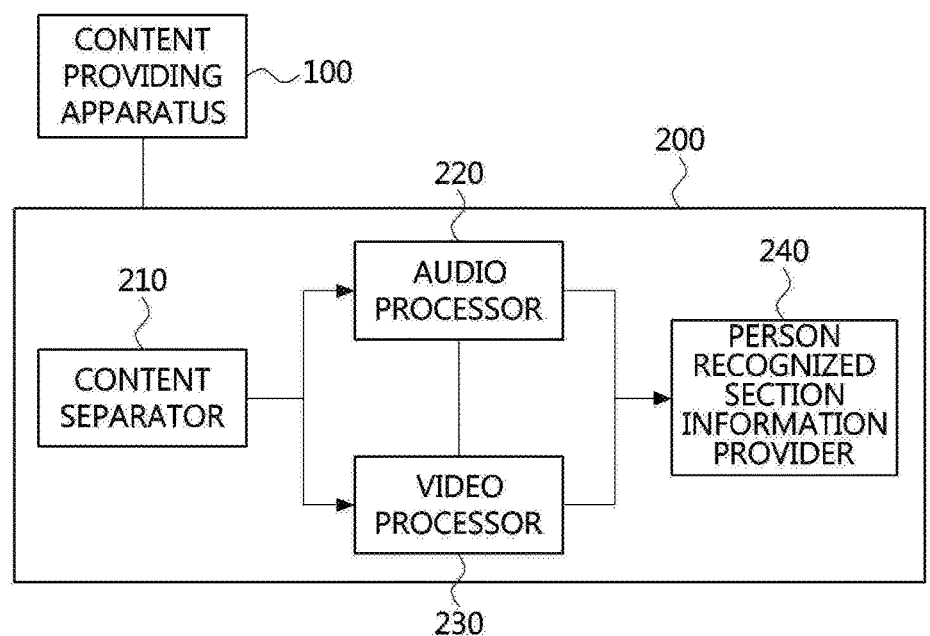
FIG. 1 is a block diagram of an apparatus for recognizing a person according to an example embodiment of the present invention.

Example embodiments of the present invention are disclosed herein. However, specific structural and functional details disclosed herein are merely representative for purposes of describing example embodiments of the present invention, and example embodiments of the present invention may be embodied in many alternate forms, and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be, used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 is a block diagram of an apparatus for recognizing a person according to an example embodiment of the present invention.

The present invention is intended to reduce sections of contents in which no actor or actress is recognized and improve a person recognition rate by using face recognition and speaker recognition together. To this end, an apparatus for recognizing a person or character (referred to as "person recognition apparatus" below) according to an example embodiment of the present invention is provided as shown in FIG. 1. The person recognition apparatus according to an example embodiment of the present invention greatly facilitates generation of many pieces of learning data by applying face recognition technology to the process of preparing for learning data for speaker recognition technology.

Referring to FIG. 1, a person recognition apparatus 200 according to an example embodiment of the present invention may operate in conjunction with a video content providing apparatus 100, and include a content separator 210, an audio processor 220, a video processor 230, and a person recognized section information provider 240.

In FIG. 1, the person recognition apparatus 200 receives content stored in the form of a file as an input and performs face recognition. The content providing apparatus 100 may be included in the same hardware as the person recognition apparatus 200. The content providing apparatus 100 may be a storage, for example, a network attached storage (NAS) and the like, connected to the person recognition apparatus 200 via a network, but is not limited to the aforementioned example.

The person recognition apparatus 200 is a server, and information on a person-appearing section generated and provided by the person recognition apparatus 200 may be transmitted to a display device, a user terminal, and the like and finally provided to a user.

When contents are input from the content providing apparatus 100, the content separator 210 separates the received contents into video content and audio content.

The audio content separated by the content separator 210 is supplied to the audio processor 220, and the video content is supplied to the video processor 230.

The video processor 230 periodically extracts a frame image from the video content input from the content separator 210, and performs face detection and face alignment in units of extracted frames. Also, the video processor 230 performs face recognition on an aligned face image, and outputs information on a face recognition section in the contents obtained by face tracking.

The audio processor 220 separates the audio content input from the content separator 210 into a voice part and a music part. After segmenting the separated voice part, the audio processor 220 performs speaker recognition by using deep learning, and outputs information on an obtained speaker recognition section of the contents.

The person recognized section information provider 240 comprehensively analyzes the information on the face recognition section in the contents and the information on the speaker recognition section in the contents and provides information on a person recognition section in the contents.

Figure 2:
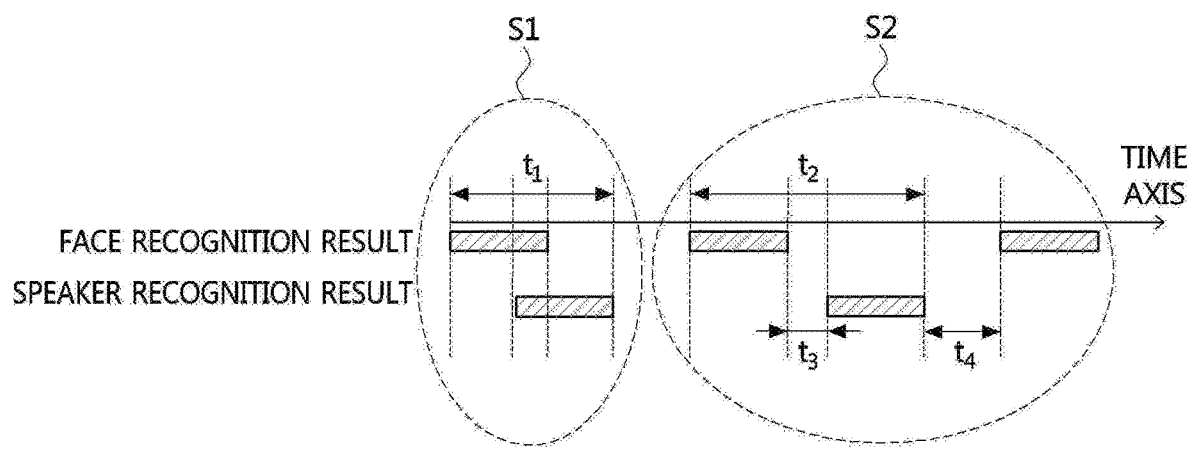
FIG. 2 is a conceptual diagram of a method of recognizing a person-appearing section of a video content according to an example embodiment of the present invention.

FIG. 2 is a conceptual diagram of a method of recognizing a person-appearing section of contents according to an example embodiment of the present invention.

FIG. 2 is a conceptual diagram showing a process of obtaining information on a section of contents in which a person appears by integrating face recognition section information of the contents with speaker recognition section information of the contents according to an example embodiment of the present invention.

According to an example embodiment of the present invention, similar time periods in which the same person is recognized to appear are considered as the same scene, and the time periods may be integrated and recognized as a section in which the person appears.

For example, when it is determined as a result of analyzing a face recognition result and a speaker recognition result in a first section S1 of the graph shown in FIG. 2 that the corresponding face is the corresponding speaker's, it is determined whether a face recognition result section and a speaker recognition result section overlap on the time axis. When the face recognition result section and the speaker recognition result section overlap partially or completely, an appearance section of the person may be determined to be the union of the face recognition result section and the speaker recognition result section. In other words, an appearance section of the person may extend as $t_1$ in the first section S1 of FIG. 2.

Similarly, in a second section S2 of FIG. 2, a face recognition result and a speaker recognition result may correspond to the same person, but a face recognition result section and a speaker recognition result section may not overlap; and a time difference $t_3$ between the two sections may be smaller than a predefined threshold value. In this case, a person appearance section may be determined to be the sum of the face recognition result section, the speaker recognition result section, and the gap between the two sections. In other words, an appearance section of the person may extend as $t_2$ in the second section S2 of FIG. 2.

However, when a time difference between sections, for example, $t_4$ of FIG. 2, is larger than the threshold value, an appearance section of the corresponding person does not extend and is divided on the basis of the time difference between the sections.

As described with reference to FIG. 2, according to an example embodiment of the present invention, it is possible to extend a person recognition section by integrating recognition information based on the face recognition technology and recognition information based on the speaker recognition technology.

Figure 3:
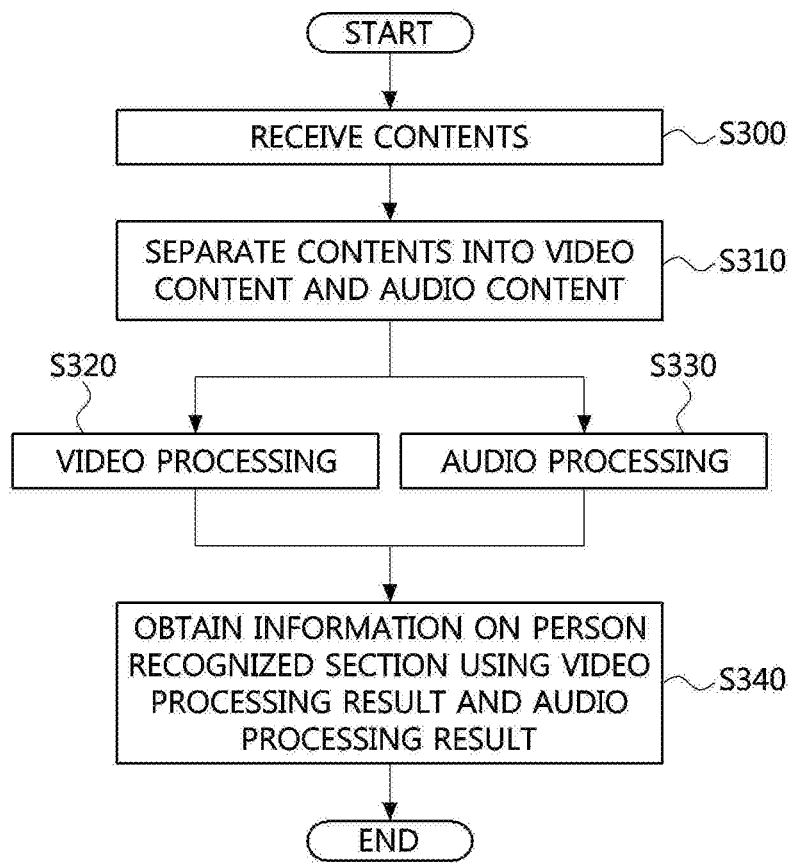
FIG. 3 is an operational flowchart of a method of recognizing a person according to an example embodiment of the present invention.

FIG. 3 is an operational flowchart of a method of recognizing a person according to an example embodiment of the present invention.

A method of recognizing a person or a character (referred to as "person recognition method" below) according to an example embodiment of the present invention analyzes and provides a time section of contents in which a person appears, and may be performed by, for example, the person recognition apparatus described above with reference to FIG. 1 or a person recognition apparatus that will be described below with reference to FIG. 7. However, a subject that executes the person recognition method according to an example embodiment of the present invention is not limited to a person recognition apparatus.

Referring to FIG. 3, the person recognition apparatus separates input content into video content, which is image-related information, and audio content, which is sound information (S300 and S310). The separated audio content is subjected to an audio processing process S330, and the video content is subjected to a video processing process S320.

In the video processing process S320, a frame image is periodically extracted from the input contents, and face detection and face alignment are performed in units of extracted frames. Also, in the video processing process S320, face recognition is performed on an aligned face image, and information on an obtained face recognition section of the contents is output.

In the audio processing process S330, the input audio content is separated into a voice part and a music part. In the audio processing process S330, after the separated voice part is segmented, speaker recognition is performed by using deep learning, and information on an obtained speaker recognition section of the contents is output.

The person recognition apparatus obtains information on a person recognition section of the contents by comprehensively analyzing the information on the face recognition section of the contents obtained in the video processing process S320 and the information on the speaker recognition section of the contents obtained in the audio processing process S330 (S340).

Figure 4:
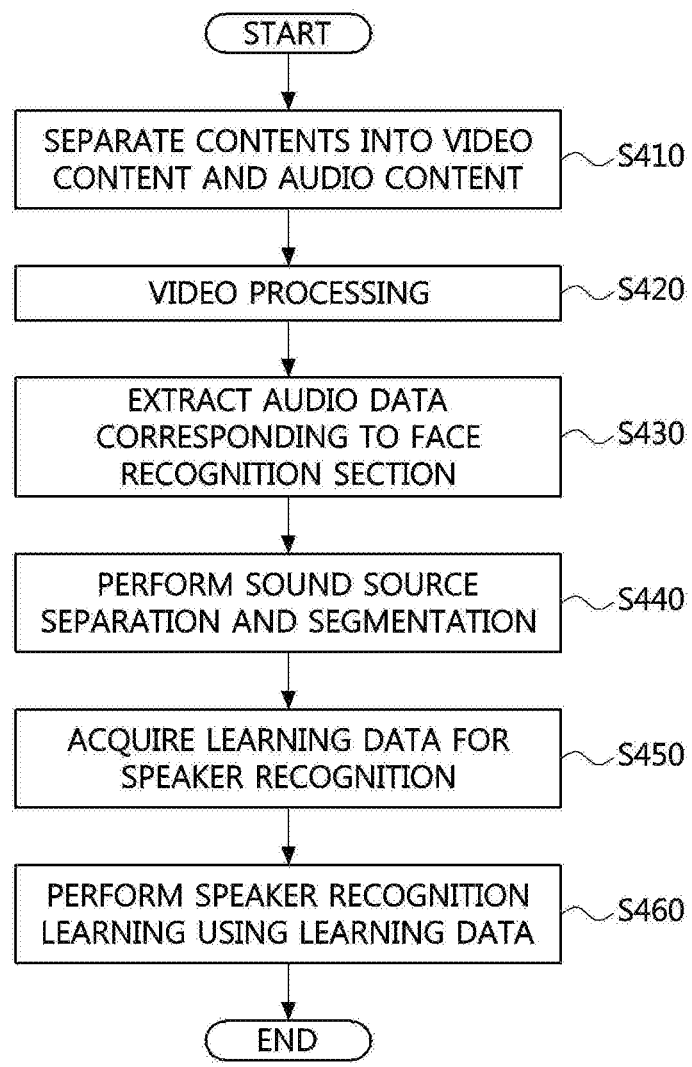
FIG. 4 is an operational flowchart of a method of acquiring learning data for speaker recognition according to an example embodiment of the present invention.

FIG. 4 is an operational flowchart of a method of acquiring learning data for speaker recognition according to an example embodiment of the present invention.

In general, many pieces of voice data are required to learn speaker recognition using deep learning, and this requires more time and efforts than face image collection for face recognition. Face image collection makes it possible to acquire learning data by crawling an image search result of a search engine or a web image, but makes it difficult to acquire learning data for voice recognition.

Therefore, an automated data collection method is required to learn voice recognition. In an example embodiment of the present invention, a face recognition result is used as data for learning voice recognition. In other words, after many movie and drama video clips are acquired, face recognition section information of an actor or actress is obtained from the video clips by using the face recognition technology, and voice of the corresponding section may be extracted and used as learning data for speaker recognition.

The method of acquiring learning data for speaker recognition illustrated in FIG. 4 may be performed by the person recognition apparatus described, with reference to FIG. 1, and detailed blocks of the person recognition apparatus of FIG. 1 may be used almost as they are. It is a great advantage that modules used in FIG. 1 may be used almost as they are.

Referring to FIG. 4, the person recognition apparatus divides input contents into video content, which is image-related information, and audio content, which is sound information (S410). When the contents are input, face detection and alignment, face recognition, and face tracking are performed through video processing (S420) such that face recognition section information may be acquired. The face recognition section information may include an identification (ID), an appearance start time, and an appearance end time of a recognized character, actor, or an actress. Audio data, corresponding to the face recognition section is extracted based on video processing results (S430), and sound source separation and segmentation are performed (S440). As results of audio processing including a voice extraction process using sound source separation and a segmentation process, learning data for speaker recognition may be acquired (S450), and learning of speaker recognition may be performed by using the acquired learning data (S460).

Since voice and music are frequently provided together in movie or drama content, the performance of speaker recognition may be improved by separating voices of people through sound source separation. Many pieces of learning data may be acquired in an automated process as illustrated in FIG. 4, and the data may be used to generate a deep learning-based speaker recognition learning model.

Figure 5:
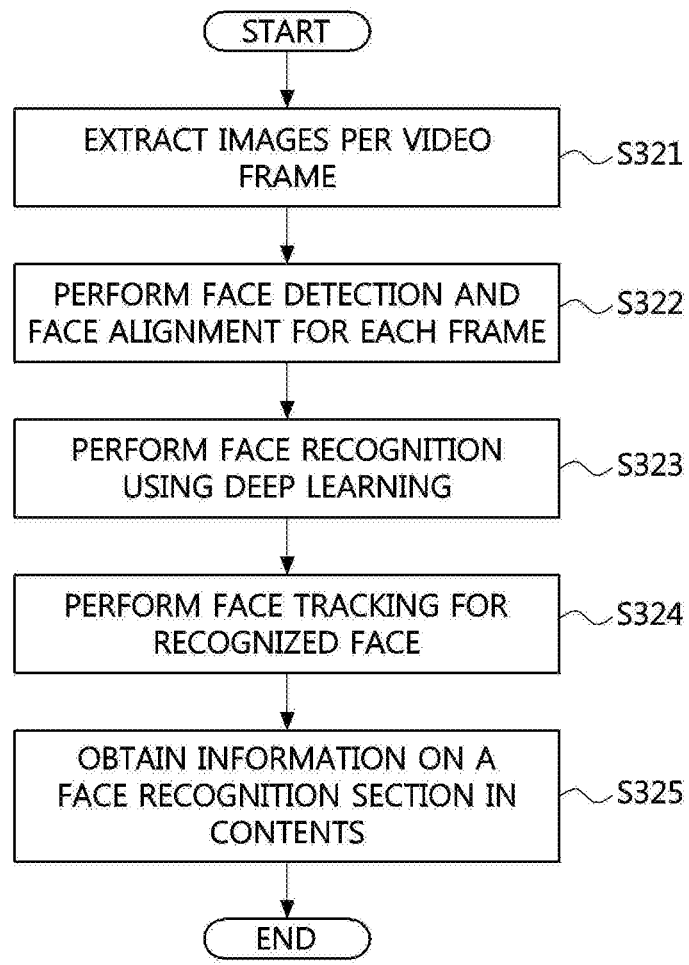
FIG. 5 is a detailed operational flowchart of video processing for person recognition according to an example embodiment of the present invention.

FIG. 5 is a detailed operational flowchart of video processing for person recognition according to an example embodiment of the present invention.

FIG. 5 illustrates a detailed operating method of video processing, and the operating method may be performed by a person recognition apparatus or a video processor according to an example embodiment of the present invention.

When reception of video data separated from contents is started, the video processor extracts images per video frame (S321). Subsequently, face detection and face alignment are performed on image extracted from each frame (S322). According to an example embodiment of the present invention, it is possible to improve the accuracy of face recognition by performing face alignment after face detection. In a face detection process according to an example embodiment of the present invention; it is possible to detect a face image by using Haar-like features or deep learning-based object detection technology.

In general, the adaptive boosting (AdaBoost) algorithm is widely used for face detection. As the most popular boosting, algorithm, the AdaBoost algorithm is simple and efficient. To detect a face by using the AdaBoost algorithm, it is necessary to extract a large number of feature points from a person's face. To solve this problem, a method using Haar-like features has been proposed.

In a face detection method using Haar-like features, rectangular regions, which are adjacent to each other in various ways according to positions, shapes, and sizes in a detection window, are taken into consideration to sum pixel intensities of each region, and calculated difference values materialize subsections of an image. In other words, the calculated difference values are used to show difference between a face region and a non-face region.

Face alignment results in the generation of a face image that is aligned through a two dimensional (2D) conversion or three dimensional (3D) conversion process based on feature, points of a detected face image. A face alignment process is an important process for improving the performance of face recognition. When face detection and face alignment are completed, face recognition is performed using deep learning (S323). Here, face recognition is performed by receiving an aligned face as an input and outputting a 1:N face identification result. Face recognition according to an example embodiment of the present invention may improve the performance of face recognition by using a deep learning-based algorithm.

Many pieces of learning data are required to use a deep learning-based algorithm, and face images of actors and actresses may be acquired by crawling an image search result of a search engine or a web image. To this end, the person recognition apparatus according to an example embodiment of the present invention may operate in conjunction with various search engines and include a communication module for operating in conjunction with a network and a search engine. For example, the name of enactor or actress who will be learned may be used as a label, and AlexNet, a Visual Geometry Group (VGG) network, an Inception network, etc. may be caused to learn collected images as learning data.

When a face recognition result passes through softmax, which is the last operation (or layer) of deep learning a vector of actor- or actress-specific recognition rates is calculated regarding the corresponding face. Softmax is a function that normalizes all input values into output values between 0 and 1, and the sum of output values is always 1. Softmax may be represented by Equation 1 below.

$$\sigma(z)_j = \frac{e^{z_j}}{\sum_{k=1}^{K} e^{z_k}} \text{ for } j = 1, \ldots, K. \quad \text{[Equation 1]}$$

When a softmax function is used, the number of classes to be classified may be configured as outputs, and a class that is assigned the largest output value may be used as a class having the highest probability. In Equation 1, a recognition rate vector δ(z) is a K-dimensional vector. Each value is between 0 and 1, and the sum of values is 1. According to an example embodiment of the present invention, when a difference between the largest value and the second largest value among recognition rate values is smaller than a threshold value, it may be determined that no face has been recognized.

When face recognition is completed, face tracking is performed beginning with a frame of the video on which face recognition has been successfully performed (S324). In the tracking process, a similarity between a face image of a previous frame and a face image of a current frame is calculated, and when the similarity becomes smaller than a certain value, tracking is finished. A section of the video in which a person (e.g., an actor or an actress) or a character appears begins at a person appearance start time at which face recognition succeeds and tracking is started, and ends at a person appearance end time at which tracking is finished.

When tracking is finished, information on a face recognition section of the video is obtained (S325).

Figure 6:
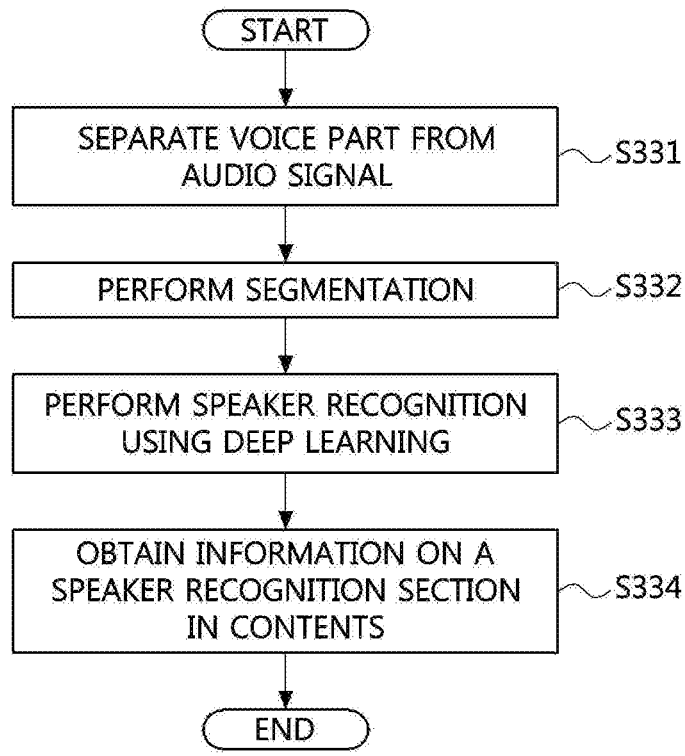
FIG. 6 is a detailed operational flowchart of audio processing for person recognition according to an example embodiment of the present invention.

FIG. 6 is a detailed operational flowchart of audio processing for person recognition according to an example embodiment of the present invention.

FIG. 6 illustrates a detailed operating method of audio processing described with reference to the example embodiment of FIG. 3, and the operating method may be performed by a person recognition apparatus or an audio processor according to an example embodiment of the present invention.

When reception of audio data separated from contents is started, the audio processor separates an audio signal into a voice part and a music part by using an independent component analysis (ICA) technique (S331).

As a method used to separate a blind signal, ICA is a computational method for separating a multivariate signal into additive subcomponents. Since voice and music are provided together in many scenes of movie or drama content, the performance of speaker recognition may be improved by removing a music component and separating voices of people. Also, since movie or drama content is generally in stereo, it is possible to separate sound sources by using ICA.

When the voice part is separated from the audio signal, the audio processor segments the voice signal on the basis of silence (S332). The audio processor performs speaker recognition by using unit voices separated by segmentation as inputs (S333).

Like video processing, when a speaker recognition result passes through softmax, which is the last operation (or layer) of deep learning, a vector of actor- or actress-specific recognition rates is obtained regarding the corresponding voice. Equation 1 described above is as follows.

$$\sigma(z)_j = \frac{e^{z_j}}{\sum_{k=1}^{K} e^{z_k}} \text{ for } j = 1, \ldots, K. \quad \text{[Equation 1]}$$

In Equation 1, a recognition rate vector δ(z) is a K-dimensional vector. Each value is between 0 and 1, and the sum of values is 1. When a difference between the largest recognition rate value and the second largest recognition rate value is smaller than a threshold value, it may be determined that no voice has been recognized.

When speaker recognition is Completed by using deep learning, information on a speaker recognition section in the contents is obtained (S334). The speaker recognition section information is integrally analyzed together with face recognition section information generated through face recognition, and is used to generate actor/actress recognition section information.

Figure 7:
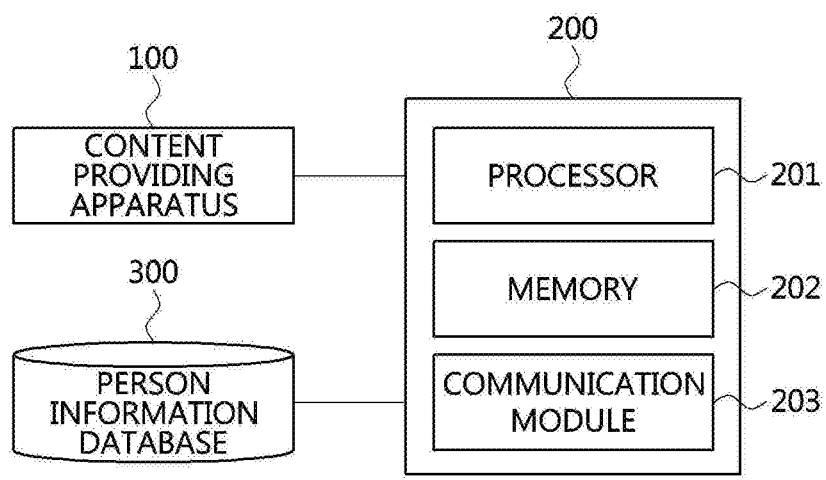
FIG. 7 is a block diagram of an apparatus for recognizing a person according to another example embodiment of the present invention.

FIG. 7 is a block diagram of an apparatus for recognizing a person according to another example embodiment of the present invention.

A person recognition apparatus 200 according to another example embodiment of the present invention may include a processor 201, a memory 202, a communication module 203, and a person information database 300.

As shown in FIG. 7, the person information database 300 may exist as hardware separate from the person recognition apparatus 200. The person information database 300 may store information on at least one person and information on a section of contents in which the at least one person appears.

Referring to FIG. 7, the person recognition apparatus 200 according to the other example embodiment of the present invention may include the processor 201 and the memory 202 for storing at least one instruction executed by the processor 201.

Here, the at least one instruction may include an instruction to receive and separate contents into video content and audio content, an instruction to recognize a face from an image in the video content and obtain information on a face recognition section by analyzing the video content, an instruction to recognize a speaker from voice data in the audio content and obtain information on a speaker recognition section by analyzing the audio content, and an instruction to provide information on a section of the contents in which a person appears based on the information on the face recognition section and the information on the speaker recognition section.

The person recognition apparatus may operate in conjunction with at least one search engine via a network and include a communication module 203 for receiving contents from at least one content providing apparatus and transferring the received video content to the processor 201.

According to the above-described example embodiments of the present invention, speaker recognition can be used to recognize an actor or actress in an environment in which face recognition does not work properly, and face recognition can be used to recognize an actor or actress in an environment in which speaker recognition does not work properly such that a section of contents in which it is possible to expand an actor or actress can be recognized. Person recognized section information generated by using face recognition and speaker recognition makes it possible to provide an application service such as a video clip scene search service.

In addition, many pieces of learning data are required to perform learning for speaker recognition, and face recognition information collected by using the face recognition technology can be used as learning data for speaker recognition. Therefore, when speaker recognition is performed on commercial content such as a movie or a drama, the present invention can improve the performance of speaker recognition.

According to the above-described example embodiments of the present invention, a speaker recognition process is added behind a face recognition process such that sections in which an actor or actress is not recognized can be reduced in contents.

In addition, it is possible to automatically generate and provide a plurality of pieces of learning data for speaker recognition by using the face recognition technology.

While the example embodiments of the present invention and their advantages have been described in detail, it should be understood that various changes, substitutions and alterations may be made herein without departing from the scope of the invention.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

While the embodiments of the present disclosure and their advantages have been described in detail, it should be understood that various changes, substitutions and alterations may be made herein without departing from the scope of the present disclosure.

What is claimed is:

1. An apparatus for recognizing a person, the apparatus comprising:
    a content separator configured to receive contents and separate the contents into video content and audio content;
    a video processor configured to recognize a face from an image in the video content received from the content separator and obtain information on a face recognition section by analyzing the video content;
    an audio processor configured to recognize a speaker from voice data in the audio content received from the content separator and obtain information on a speaker recognition section by analyzing the audio content; and
    a person recognized section information provider configured to provide information on a section of the contents in which a person appears based on the information on the face recognition section and the information on the speaker recognition section,
    wherein the person recognized section information provider selects the face recognition section and the speaker recognition section of the person by comparing the information on the face recognition section and the information on the speaker recognition section, and determines whether the face recognition section and the speaker recognition section of the person overlap,
    wherein the person recognized section information provider determines a union of the face recognition section and the speaker recognition section as a person recognition section when the face recognition section and the speaker recognition section of the person overlap, and
    wherein the person recognized section information provider determines a sum of the face recognition section, the speaker recognition section, and a gap as a person recognition section when the face recognition section and the speaker recognition section of the person are adjacent but separated by the gap of a threshold value or less.

2. The apparatus of claim 1, wherein the video processor periodically extracts a frame image from the video content input from the content separator, performs face detection and face alignment in units of extracted frames, performs face recognition on an aligned face image, and performs face tracking.

3. The apparatus of claim 2, wherein the video processor performs the face recognition by using a Softmax function in a deep learning model output process.

4. The apparatus of claim 2, wherein the video processor performs the face detection by using Haar-like features or deep learning-based object detection technology.

5. The apparatus of claim 2, wherein the video processor performs the face tracking while calculating a similarity between a face image of a previous frame and a face image of a current frame, and finishes the face tracking when the similarity between the face image of the previous frame and the face image of the current frame is a threshold value or less.

6. The apparatus of claim 1, wherein the audio processor extracts a voice signal from the audio content by using an independent component analysis (ICA) technique, segments the voice signal based on silence, and performs speaker recognition on segmented unit voices.

7. The apparatus of claim 6, wherein the audio processor performs face recognition by using a Softmax function in a deep learning model output process.

8. The apparatus of claim 1, wherein the audio processor uses face recognition data obtained from the video processor to generate a speaker recognition learning model, wherein the face recognition data comprises an identification, an appearance start time of a recognized person, an appearance end time of the recognized person and the audio processor enhances the speaker recognition learning model for the recognized person by analyzing the voice data between the appearance start time and the appearance end time for the recognized person.

9. A method of recognizing a person, the method comprising:
 receiving contents and separating the contents into video content and audio content;
 a video processing of recognizing a face from an image in the video content and obtaining information on a face recognition section by analyzing the video content;
 an audio processing of recognizing a speaker from voice data in the audio content and obtain information on a speaker recognition section by analyzing the audio content; and
 providing information on a section of the contents in which a person appears based on the information on the face recognition section and the information on the speaker recognition section,
 wherein the providing information on the section of the contents in which the person appears includes:
 selecting the face recognition section and the speaker recognition section of the person by comparing the information on the face recognition section and the information on the speaker recognition section;
 determining whether the face recognition section and the speaker recognition section of the person overlap;
 determining a union of the face recognition section and the speaker recognition section as a person recognition section when the face recognition section and the speaker recognition section of the person overlap; and
 determining a sum of the face recognition section, the speaker recognition section, and a gap as a person recognition section when the face recognition section and the speaker recognition section of the person are adjacent but separated by the gap of a threshold value or less.

10. The method of claim 9, wherein the video processing operation comprises:
 periodically extracting a frame image from the video content;
 performing face detection and face alignment in units of extracted frames;
 performing face recognition on an aligned face image; and
 generating the face recognition section by tracking a recognized face.

11. The method of claim 10, wherein the performing face detection and face alignment in units of extracted frames comprises:
 performing the face detection by using Haar-like features or deep learning-based object detection technology; and
 aligning the face based on feature points of a detected face image.

12. The method of claim 10, wherein the generating the face recognition section by tracking the recognized face comprises performing the face tracking while calculating a similarity between a face image of a previous frame and a face image of a current frame, and finishing the face tracking when the similarity between the face image of the previous frame and the face image of the current frame is a threshold value or less.

13. An apparatus for recognizing a person, the apparatus comprising:
 a processor; and
 a memory configured to store at least one instruction executed by the processor,
 wherein the at least one instruction includes:
 an instruction to receive and separate contents into video content and audio content;
 an instruction to recognize a face from an image in the video content and obtain information on a face recognition section by analyzing the video content;
 an instruction to recognize a speaker from voice data in the audio content and obtain information on a speaker recognition section by analyzing the audio content; and
 an instruction to provide information on a section of the contents in which a person appears based on the information on the face recognition section and the information on the speaker recognition section,
 wherein the instruction to provide information on a section of the contents in which a person appears is configured to:
 select the face recognition section and the speaker recognition section of the person by comparing the information on the face recognition section and the information on the speaker recognition section;
 determine whether the face recognition section and the speaker recognition section of the person overlap;
 determine a union of the face recognition section and the speaker recognition section as a person recognition section when the face recognition section and the speaker recognition section of the person overlap; and
 determine a sum of the face recognition section, the speaker recognition section, and a gap as a person recognition section when the face recognition section and the speaker recognition section of the person are adjacent but separated by the gap of a threshold value or less.

14. The apparatus of claim 13, further comprising a communication module configured to operate in conjunction with at least one search engine via a network, receive contents from at least one content providing apparatus, and transfer the contents to the processor.

15. The apparatus of claim 13, further comprising a person information database configured to store information on at least one person and information on a section of the contents in which the at least one person appears.

* * * * *